United States Patent Office 3,062,586
Patented Nov. 6, 1962

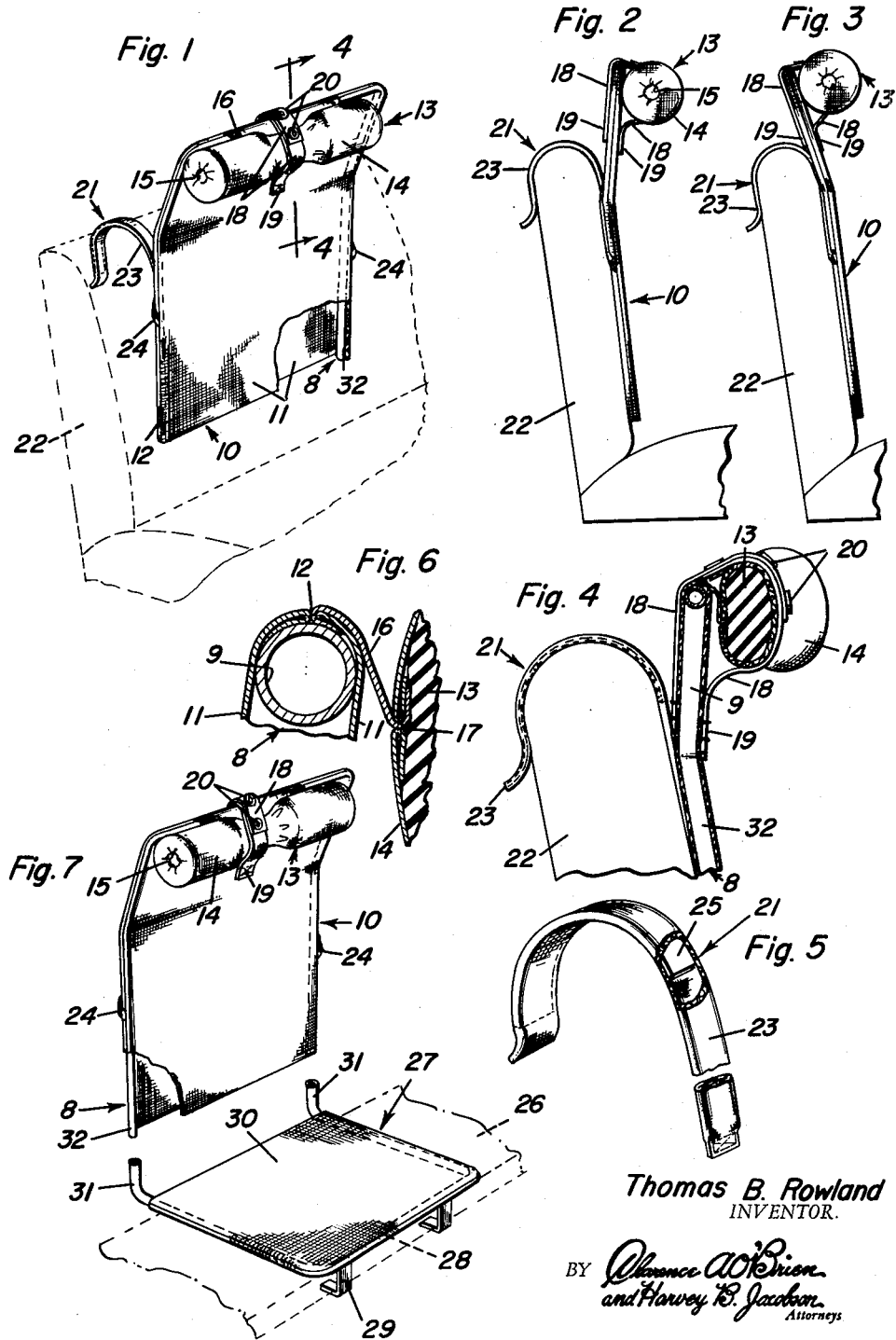

3,062,586
HEAD AND NECK REST
Thomas B. Rowland, P.O. Box 1188, Pocatello, Idaho
Filed July 13, 1960, Ser. No. 42,694
6 Claims. (Cl. 297—399)

This invention relates to new and useful improvements in head and neck rests particularly for the occupants of motor vehicles and has for its primary object to provide, in a manner as hereinafter set forth, a device of this character which is adapted to be readily mounted for use on the usual seat back of the vehicle and removed therefrom.

Another very important object of the present invention is to provide a portable rest of the aforementioned character which is reversible on the seat back for providing support in an erect position for the vehicle operator, for example, or, when reversed, providing support in a somewhat reclining position for a passenger.

Still another important object of the invention is to provide a head and neck rest of the character described comprising novel means for mounting the device for vertical adjustment on the seat back.

A further object of the present invention is to provide, in a rest of the character set forth including a cushion or pillow, means for compressing or shaping said pillow to suit the individual.

Another object of this invention is to provide a rest of the character described which may be used on spectator seats at sporting and other events.

Other objects of the invention are to provide a head and neck rest which will be comparatively simple in construction, strong, durable, compact, of light weight, comfortable and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view, showing a head and neck rest constructed in accordance with the present invention in position on an automobile seat back for giving support in an upright or erect position, as for the operator of the vehicle;

FIGURE 2 is a view in side elevation thereof;

FIGURE 3 is a side elevational view substantially similar to FIGURE 2 but showing the device reversed for giving support in an inclined or reclining position, as for a passenger in the vehicle;

FIGURE 4 is a vertical sectional view through the upper portion of the device, taken substantially on the line 4—4 of FIGURE 1;

FIGURE 5 is a detail perspective view, partially broken away, of one of the hooks or hangers through the medium of which the rest is mounted for vertical adjustment on the seat back;

FIGURE 6 is an enlarged fragmentary view in section through an intermediate portion of the device, showing the method of connecting the reversible pillow to the slip cover; and FIGURE 7 is a perspective view illustrating the use of the device on a spectator seat.

Referring now to the drawings in detail, it will be seen that the embodiment of the invention which has been illustrated comprises a generally inverted U-shaped tubular frame of suitable metal which is designated generally by reference numeral 8. The frame 8 includes an angularly bent upper portion 9. Removably mounted on the frame 8 is a slip cover 10 of suitable flexible material. The slip cover 10, which is stretched taut when applied to the frame 8, comprises opposed walls or sides 11 which are joined by an edge seam 12.

Mounted on the upper portion of the slip cover 10 is a cylindrical cushion, pad or pillow 13 of foam rubber or other suitable material. The pillow 13 includes a tubular case 14 of suitable flexible material the ends of which are closed by drawstrings 15. The pillow 13 is hung or suspended on the top portion of the slip cover 10 for use on either side thereof through the medium of a flexible hinge or strip 16 of suitable material. As shown to advantage in FIGURE 6 of the drawings, the flexible hinge 16 is secured in the seam 12 of the slip cover 10 and in the seam 17 of the pillow case 14.

Adjusting straps 18 are provided on the sides 11 of the slip cover 10 for shaping the pillow 13 to suit the individual by compressing the intermediate portion of said pillow. The straps 18 have one end portion secured to the slip cover 10 at a point below the pillow 13, as indicated at 19. Spaced snap fasteners 20 are provided on the free end portions of the straps 18 for adjustably connecting said straps with the compressed pillow 13 therebetween.

Suspension hooks or hangers 21 are provided for securing the slip cover 10 with the frame 8 therein for vertical adjustment on a motor vehicle seat back, as indicated at 22. The hooks 21 comprise flat tubes 23 of suitable flexible material having one end portion secured at 24 to the vertical edges of the slip cover 10. The other or free ends of the flat, tubular straps 23 are open for the insertion of slidably adjustable arcuate bars 25 of suitable material, preferably metal.

It is thought that the use of the device will be readily apparent from a consideration of the foregoing. Briefly, the hooks 21 are engaged over the top of the seat back 22 for mounting the rest thereon. By sliding the arcuate bars 25 longitudinally in the straps 23 the device may be adjusted vertically on the seat back. Then, by adjusting the connection of the straps 18 the intermediate portion of the pillow 13 may be compressed and shaped as desired to suit the individual. With the angularly bent upper portion 9 of the frame 8 extending forwardly as shown in FIGURES 1 and 2 of the drawings the device lends support to a user sitting erect, such as the operator of the vehicle. When support in a somewhat reclining position is desired, as for a passenger in the vehicle, the device is reversed, as shown in FIGURE 3 of the drawings. It will be noted that the flexible straps 23 permit the hooks 21 to support the device in either position. It will also be noted that the pillow 13 is so mounted that it may be hung on either side of the slip cover 10.

As shown in FIGURE 7 of the drawings, the device may also be used on a spectator seat as indicated at 26. Toward this end, a base 27 is provided. The base 27 comprises a generally U-shaped, horizontal tubular frame 28 of suitable metal. The frame 28 is mounted on the seat 26 with the bight portion of said frame at the front of said seat. Depending from the bight or front portion of the frame 28 is a pair of hooks 29 which are engageable beneath the front portion of the seat 26. Mounted on the frame 28 is a seat 30 of suitable flexible material. The frame 28 terminates in upturned end portions 31 which telescopically receive the lower end portions of the legs 32 of the frame 8. When used in the manner described, the device provides a back rest in addition to a head and neck rest.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A combined head and back rest, comprising reversible back rest panel, an upward extension provided on said panel and offset by an obtuse angle from the panel, said extension having an upper edge and opposite side surfaces, means provided on said panel for attaching the same to a seat back selectively with its opposite sides engaging the seat back whereby the plane of disposition of said extension relative to the seat back may be varied, a flexible attaching member secured to the upper edge of said extension, and a pillow connected to said attaching member, said attaching member being of such length that said pillow may be positioned selectively on the opposite side surfaces of said extension.

2. In combination with a seat back, a combined head and back rest comprising a reversible back rest panel, an upward extension provided on said panel and offset by an obtuse angle therefrom, said extension having an upper edge and opposite side surfaces, means for attaching said panel to said seat back selectively with its opposite sides engaging the seat back whereby the plane of disposition of said extension may be varied, a flexible attaching member secured to the upper end of said extension, and a pillow connected to said attaching member, said attaching member being of such length that said pillow may be positioned selectively on the opposite side surfaces of said extension.

3. The device as defined in claim 2 together with adjustable strap means for retaining said pillow selectively on the opposite side surfaces of said extension.

4. The device as defined in claim 2 together with a pair of straps secured at one end thereof to the respective opposite sides of said extension at points spaced downwardly from the upper end of the extension, said straps overlapping each other and embracing said pillow selectively on the opposite sides of the extension, and adjustable means separably connecting the overlapped portions of said straps together.

5. The device as defined in claim 2 wherein said means for attaching said panel to said seat back comprise a pair of flexible elongated elements secured to said panel and movable from one side of the panel to the other, and hooks carried by said flexible elements and engaging the top of said seat back.

6. The device as defined in claim 5 wherein said flexible elements are hollow, said hooks being slidably adjustable longitudinally in said elements.

References Cited in the file of this patent

UNITED STATES PATENTS

| | | |
|---|---|---|
| 2,491,784 | Thompson | Dec. 20, 1940 |
| 2,581,888 | Schlegel | Jan. 8, 1952 |
| 2,589,013 | Martin | Mar. 11, 1952 |
| 2,756,808 | Eichorst | July 31, 1956 |
| 2,810,430 | Jacob | Oct. 22, 1957 |
| 2,874,757 | Requa | Feb. 24, 1959 |

FOREIGN PATENTS

| | | |
|---|---|---|
| 1,191,963 | France | Oct. 22, 1959 |